L. D. Soubier
INVENTOR.

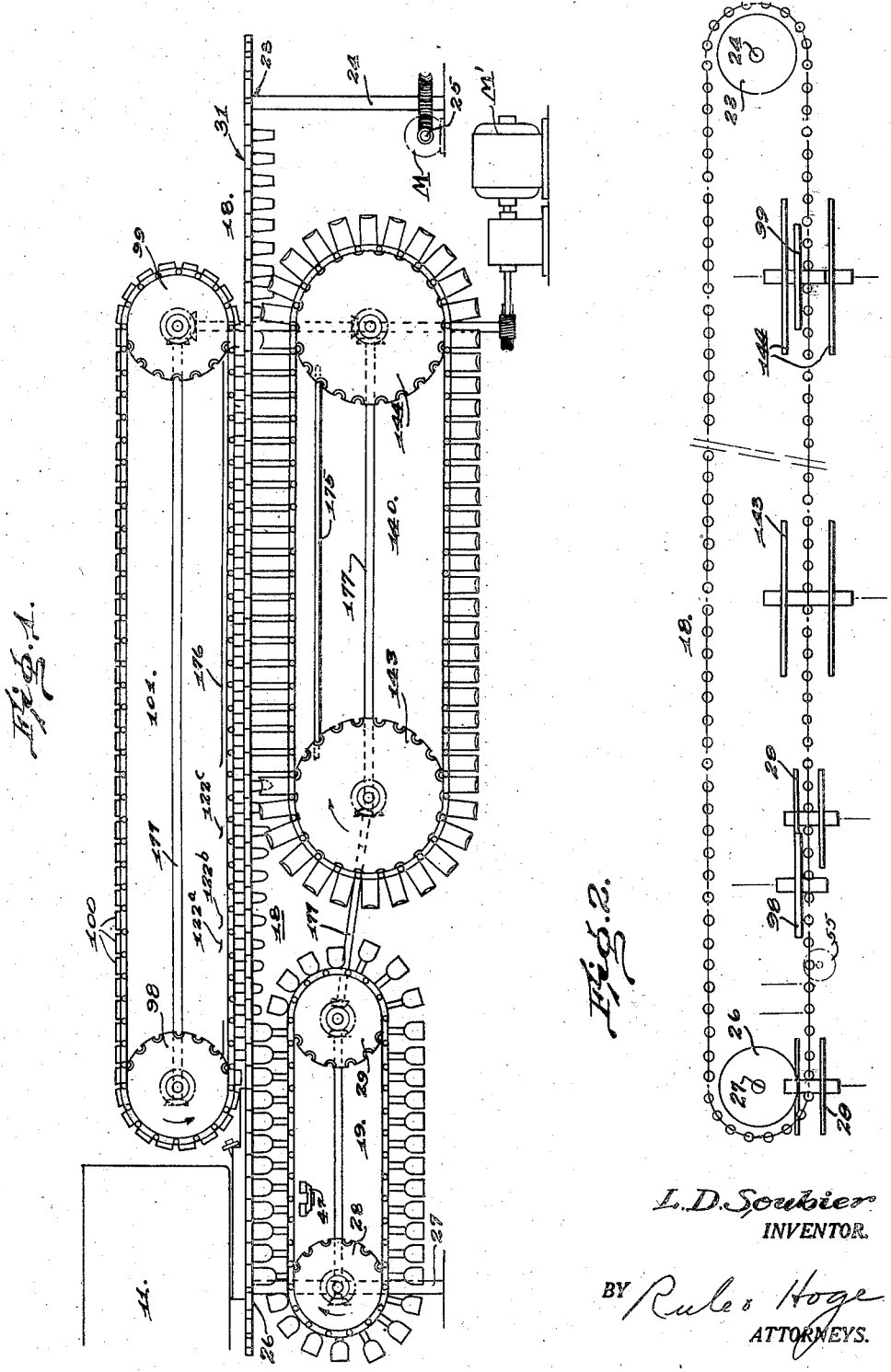

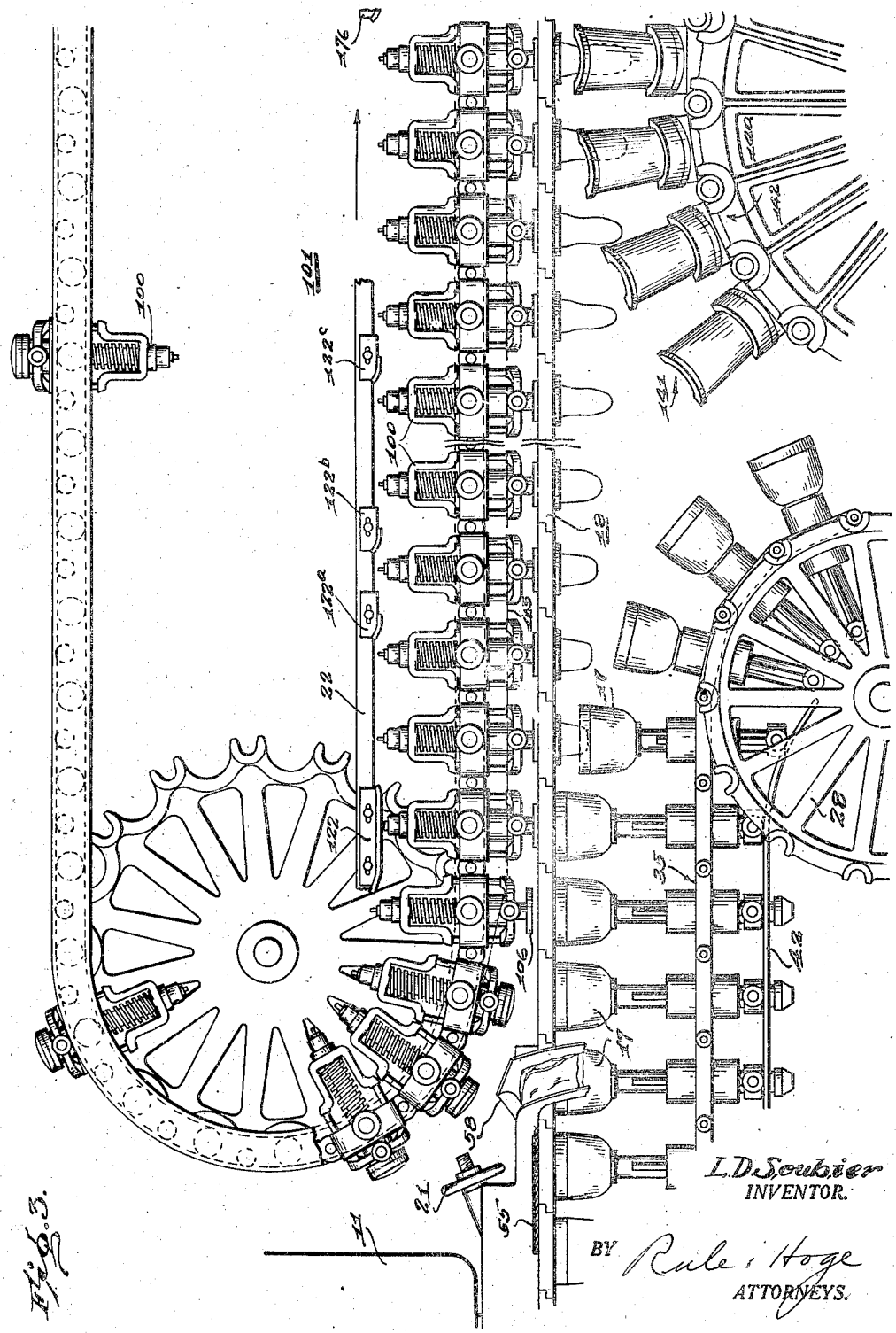

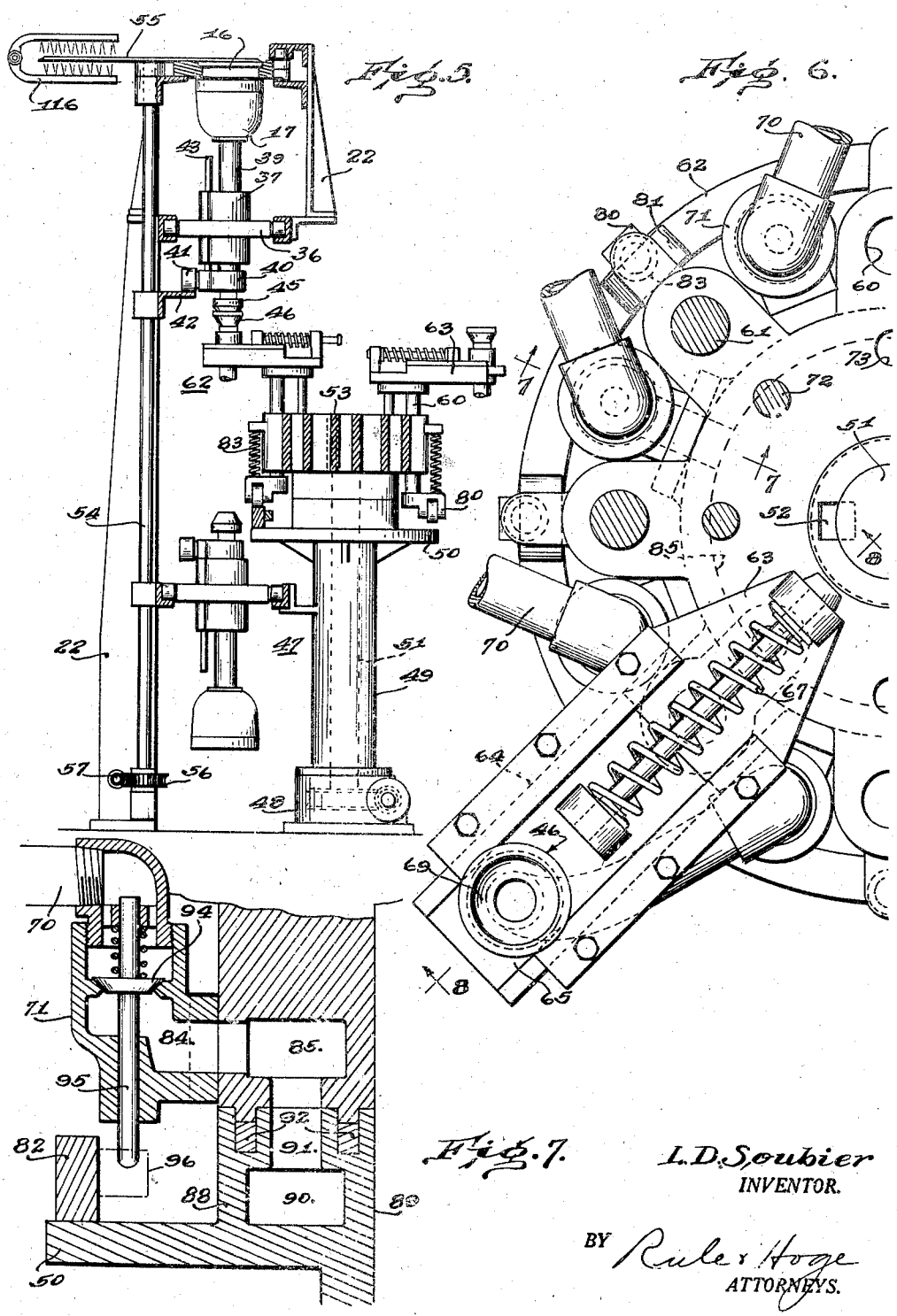

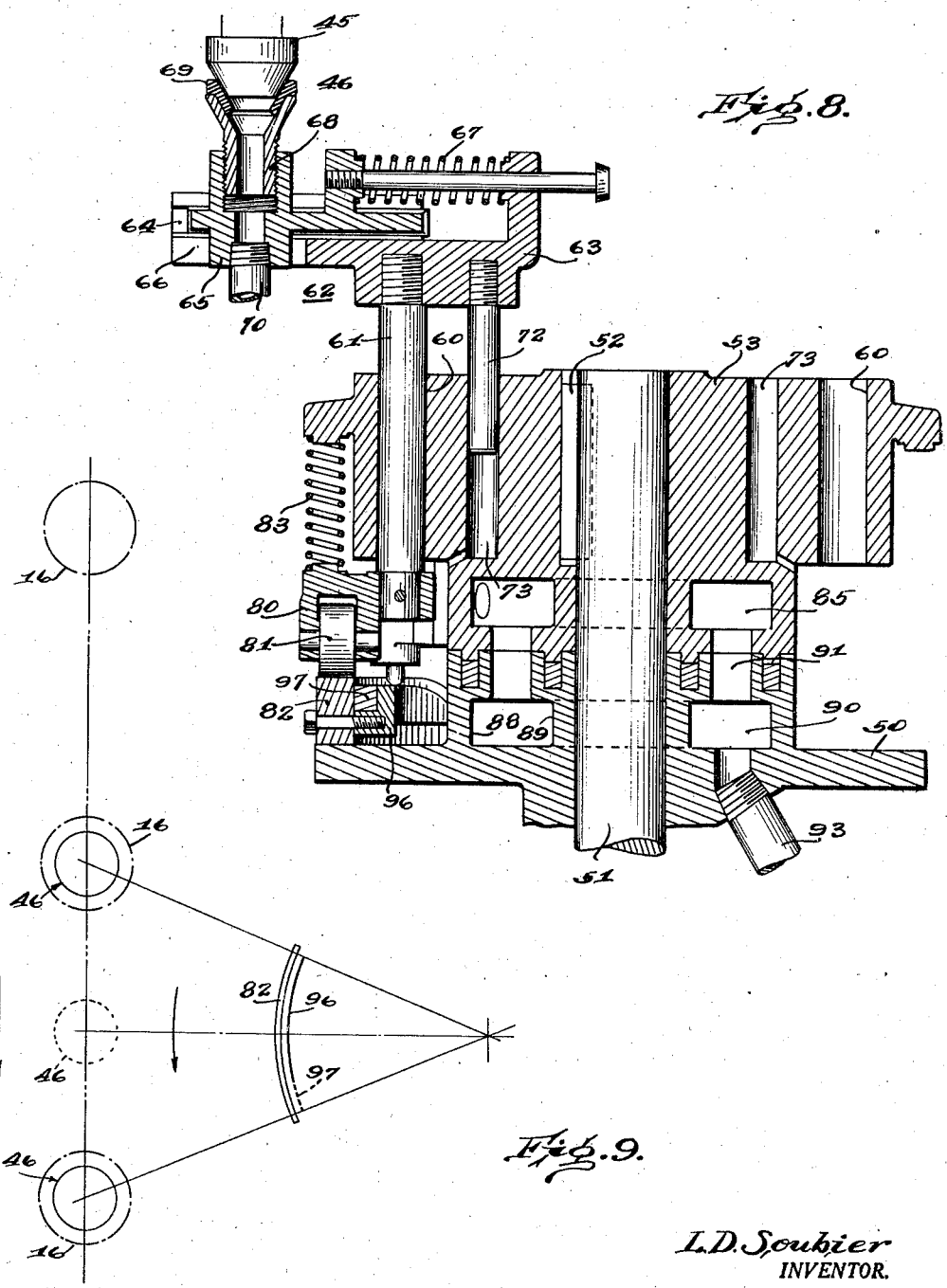

BY Rule, Hoge
ATTORNEYS.

April 21, 1942.   L. D. SOUBIER   2,280,167
GLASS WORKING APPARATUS AND METHOD
Filed Dec. 23, 1938   11 Sheets-Sheet 8

L. D. Soubier
INVENTOR.

BY Rule & Hoge
ATTORNEYS.

April 21, 1942.   L. D. SOUBIER   2,280,167
GLASS WORKING APPARATUS AND METHOD
Filed Dec. 23, 1938   11 Sheets-Sheet 9

L. D. Soubier
INVENTOR.

BY Rule & Hoge
ATTORNEYS.

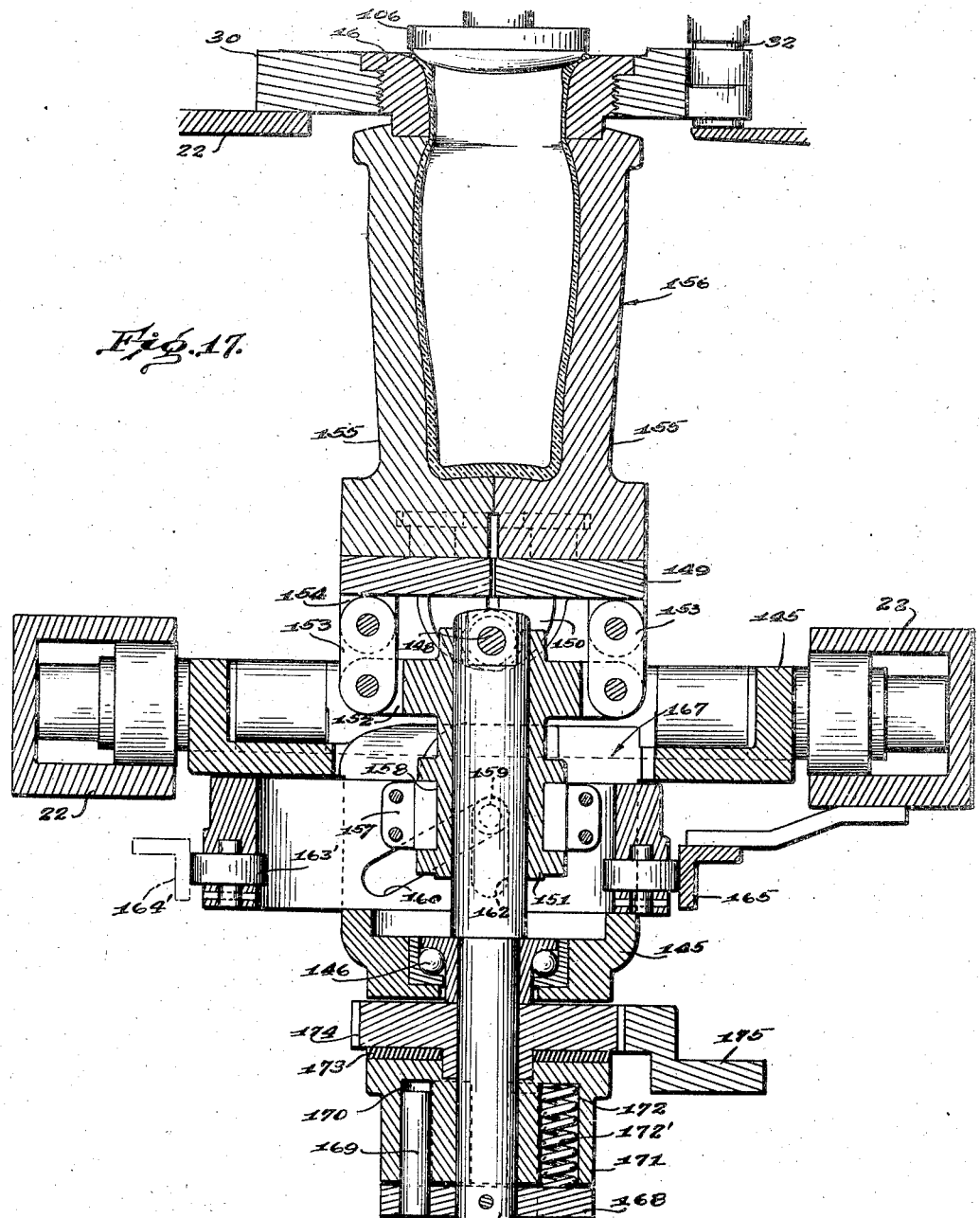

Patented Apr. 21, 1942

2,280,167

UNITED STATES PATENT OFFICE 2,280,167

GLASS WORKING APPARATUS AND METHOD

Leonard D. Soubier, Toledo, Ohio, assignor to Owens-Illinois Glass Company, a corporation of Ohio Application December 23, 1938, Serial No. 247,319

14 Claims. (Cl. 49—5)

The present invention relates to a method of and an apparatus for producing thin blown glassware. The apparatus disclosed herein is particularly designed for use in the production of tumblers although it will readily be understood that hollow blown articles of a similar nature may, by slight modification of the apparatus, be produced.

Heretofore such articles have been made by various processes among which have been the formation of the articles progressively and sequentially from a ribbon of plastic glass issuing by virtue of ribbon forming rolls from a flow opening provided in a melting tank. Such a process has involved the use of a continuous conveyor adapted to receive thereon the preformed ribbon and having at intervals apertures through which portions of the ribbon sag to subsequently be blown to shape. An endless series of blowheads moving in unison with the conveyor above a selected portion of the operative run thereof registers with the apertures to expand the sagging portions of the ribbon and an endless series of molds, also moving with the conveyor below the selected portion of the run, are adapted to enclose the sagging and partially expanded portions of the ribbon and by individual rotation thereof define the limits of expansion of these sagging portions as the articles are blown to final shape.

In such a process the thickness of the ribbon is important inasmuch as the sagging portions thereof are of a sufficiently high temperature and must possess sufficient bulk of glass to withstand blowing of the glass to final form. Generally speaking, the greater the volumetric capacity of the article being formed, the greater must be the thickness of the ribbon throughout to allow for the larger displacement of glass during the blowing operations. Likewise in such a process the temperature of the ribbon is important. In order to produce a blank of sufficient mass that it may be enclosed in a finishing mold and blown to final shape, it is necessary to allow sufficient time for the ribbon to sag through the apertures provided for the purpose. The ribbon must therefore attain a high temperature throughout its entire mass so that the sagging portions will remain plastic. This is particularly true where an open air development of the sagging portions is resorted to prior to enclosure of the developed portions in the finishing molds.

The present invention is designed as an improvement over processes of this character in that neither the thickness of the ribbon nor the temperature thereof is of any consequence as regards the formation of the blank, either in its initial creation or in the development thereof to adequate size and proper shape for enclosure in a finishing mold by means of which it is blown to final shape. In other words the ribbon is merely incidental to the formation of the blank and therefore the steps ordinarily employed to preserve a ribbon of exact thickness and temperature may be dispensed with.

In overcoming the limitations that are attendant upon processes of the character set forth above, the present invention contemplates the utilization of suction to withdraw from a discharge orifice a measured charge of glass of the exact mass required to produce the finished article while at the same time imparting to the withdrawn charge a definite shape characteristic. Such withdrawal of the charge is accompanied by an initial compacting of the charge and a consequent incidental production of a ribbon of thin proportions which is, practically speaking, so disassociated from the charge that neither its thickness nor its temperature bears any relation to the amount of material in the measured charge or to the temperature thereof. The initial compacting of the charge is effected by an ironing process which in addition to compressing the charge reduces the ribbon to relatively thin proportions and results in a considerable reduction in the amount of moile produced for any given series of articles. The character of the ribbon thus produced is such that it represents withdrawal from the discharge orifice of the amount of glass that otherwise would become chilled and be introduced into the withdrawn charges.

Prior to any appreciable cooling of the withdrawn charge, a secondary compacting operation is effected thereon and the charge is then ready for enclosure in a finishing mold. However, under certain conditions of manufacture, it is desirable to subject the charge to a certain amount of open air development, either by allowing sufficient time for the suspended charge to alter its shape by natural sagging thereof or by progressive internal expansion in which intermittent puffs of air are applied thereto, or both.

Inasmuch as the exact measured quantity of glass required in the finished article is withdrawn from the supply body initially and is almost completely disassociated from the ribbon, the mass of the charge so withdrawn is sufficiently great that its residual heat will maintain the same in a plastic condition during any open air development that may be included in the process. Furthermore, if such open air development is resorted to, equal expansion of the charge by virtue of equal heat distribution and equal chill of the exposed portions will be attained. Similarly, the full quantity of glass required for the finished article being inherently present in the charge from the point of its inception, the ribbon therefore does not supply any additional glass during any further development of the article and the character of the development may therefore be more easily controlled.

Since the ribbon merely represents chilled glass and is not depended upon either to supply additional glass to the charge during its development or in any way to modify the temperature characteristics of the original charge, it may be and preferably is severed from the charge and discarded as soon as practicable after the initial inception of the charge and prior to any open air development of the latter. By thus discarding the thin ribbon portion early in the process, full attention may be given the charge and the problems attendant upon its satisfactory expansion to finished form.

Immediately after the open air development of the charge (if any) the moile-free charge is enclosed in a finishing mold and expanded to final shape in the usual manner after which it is discharged from the apparatus.

In the accompanying drawings:

Fig. 1 is a side elevational view, diagrammatic in its representation, of a glass working machine constructed in accordance with the principles of the present invention;

Fig. 2 is a plan view, also diagrammatic in its representation, of the apparatus;

Fig. 3 is a fragmentary side elevational view of the apparatus from its feed end to approximately its medial region;

Fig. 5 is a vertical sectional view, with certain parts shown in elevation, taken through the apparatus in the ribbon severing region thereof;

Fig. 6 is a fragmentary plan view, partly in section, of a suction applying apparatus employed in connection with the invention;

Fig. 7 is a sectional view taken substantially along the line 7—7 of Fig. 6;

Fig. 8 is a sectional view taken substantially along the line 8—8 of Fig. 6;

Fig. 9 is a diagrammatic view illustrating the manner in which straight line motion of the neck ring conveyor is followed by one of the suction applying cups;

Fig. 17 is a sectional view taken substantially along the line 17—17 of Fig. 15.

Figure 4:
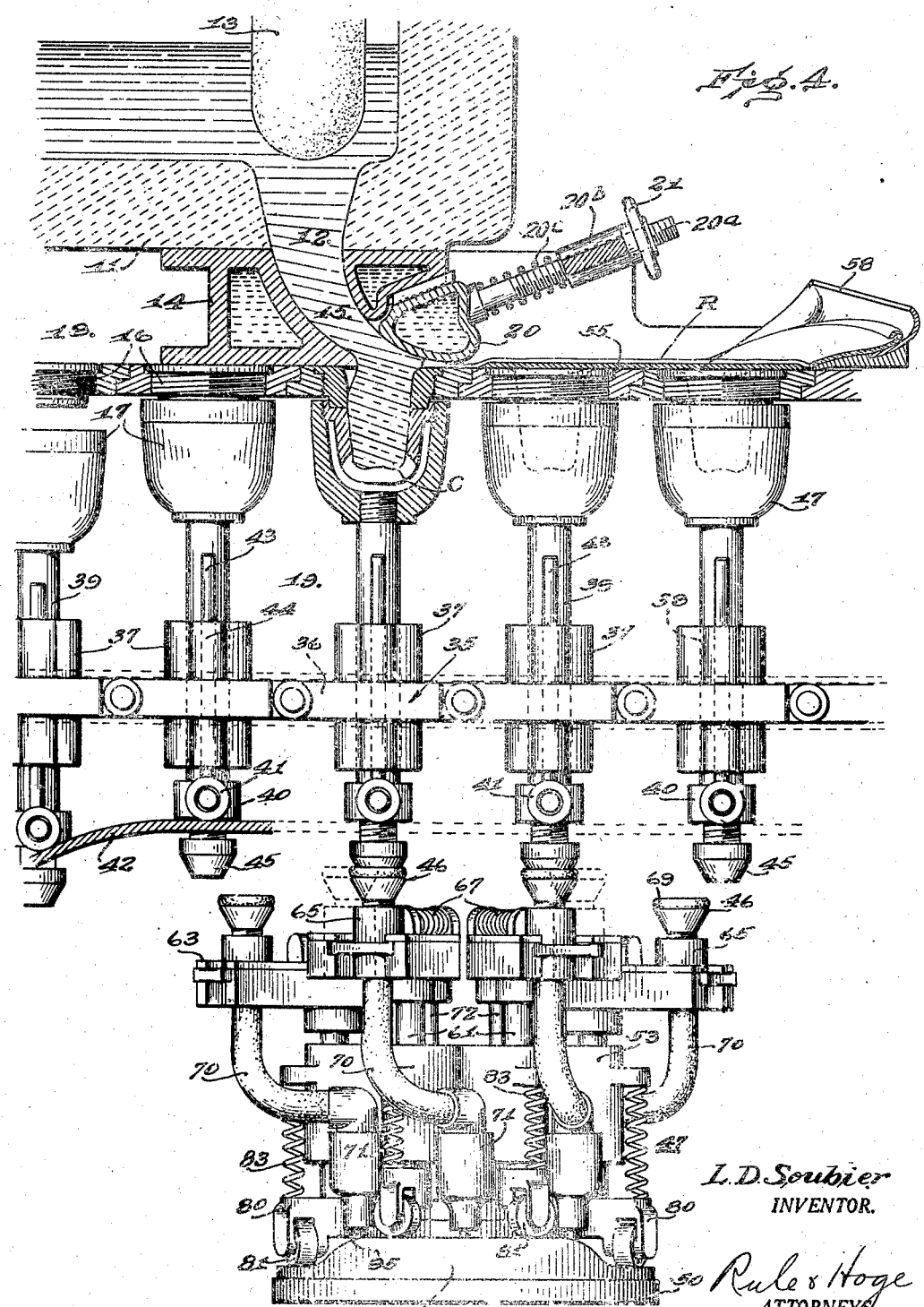
Fig. 4 is a fragmentary side elevational view, partly in section, of the apparatus in the charging region thereof.
Figure 10:
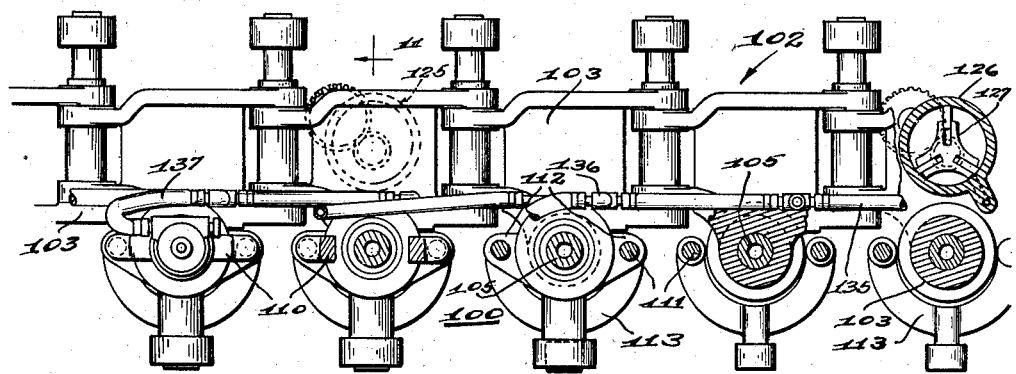
Fig. 10 is a fragmentary plan view, partly in section, of a portion of the blowhead conveyor chain.

Referring now to Fig. 4, the glass may be melted in a tank (not shown) of any approved construction, provided with a forehearth 11 having a glass issuing discharge orifice 12 in its bottom, the flow of glass through the orifice being controlled by a regulator 13.

A water cooled gathering ring 14 is disposed beneath the discharge orifice 12 and is provided with a tapered flow passage 15 the upper end of which is in register with the orifice 12 and the lower end of which is designed for register with a series of neck rings 16 and gathering cups 17 carried on separate endless conveyors 18 and 19 respectively (see also Fig. 1).

A water cooled ironing member 20 associated with the gathering ring 14 and disposed between the latter and the conveyor 18 is adjustable in an inclined direction toward and away from the conveyor by means of a hand wheel 21 and serves the twofold purpose of directing the charges of glass into the gathering cups 17 and of compacting the interconnecting ribbon or moile R of glass against the upper surface of the conveyor 18. This ironing member (Fig. 4) is secured to the inner end of a supporting for $20^a$ which extends outwardly through a guide $20^b$, the latter being supported by walls $20^d$. A coil spring $20^c$ encircling the rod between said guide and ironing member yieldingly presses the latter against the issuing stream of glass. The hand wheel 21 is threaded onto the outer end of the rod to hold the parts assembled and for the purpose of adjusting the position of said ironing member relative to the stream of glass.

The neck ring and gathering cup conveyors 18 and 19 are supported upon a stationary framework 22 (Fig. 5) and the former conveyor includes a sprocket wheel 23 (see also Fig. 1) at one end of the conveyor mounted on a vertical shaft 24 which is driven from a worm 25 connected in any suitable manner to a source of driving power such as an electric motor M. A sprocket wheel 26 (Fig. 13) is mounted at the other end of the conveyor on a vertical shaft 27.

Figure 11:
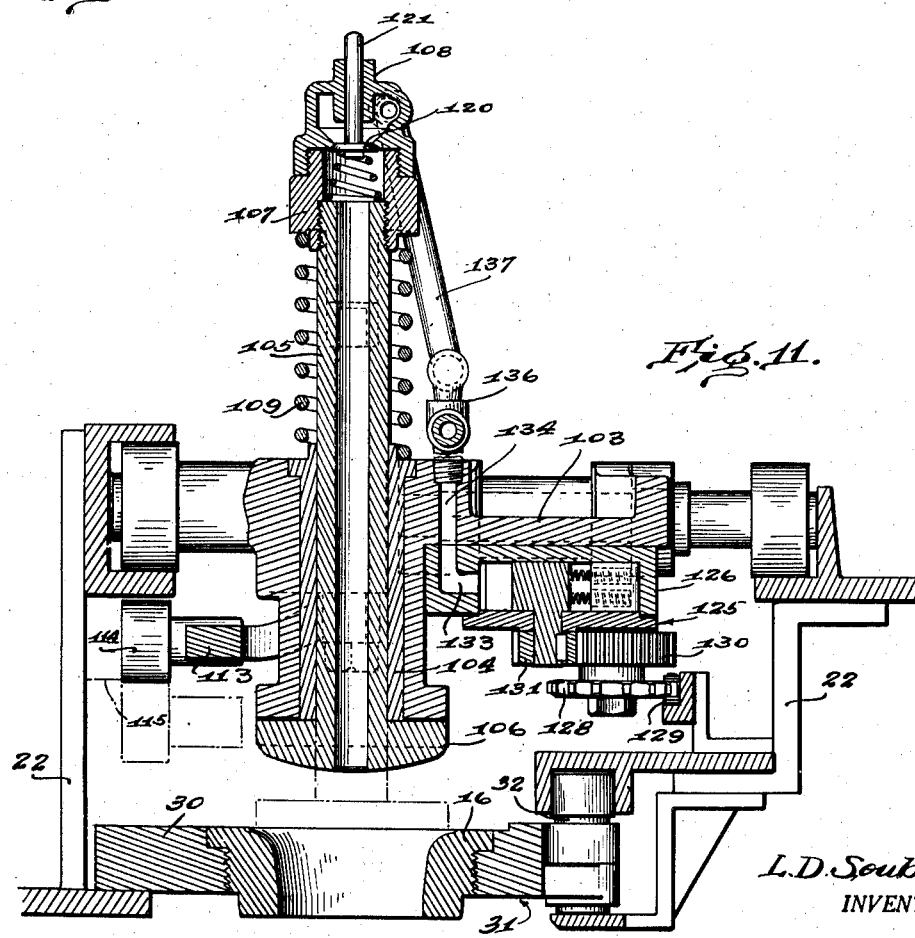
Fig. 11 is a sectional view taken substantially along the line 11—11 of Fig. 10.
Figure 13:
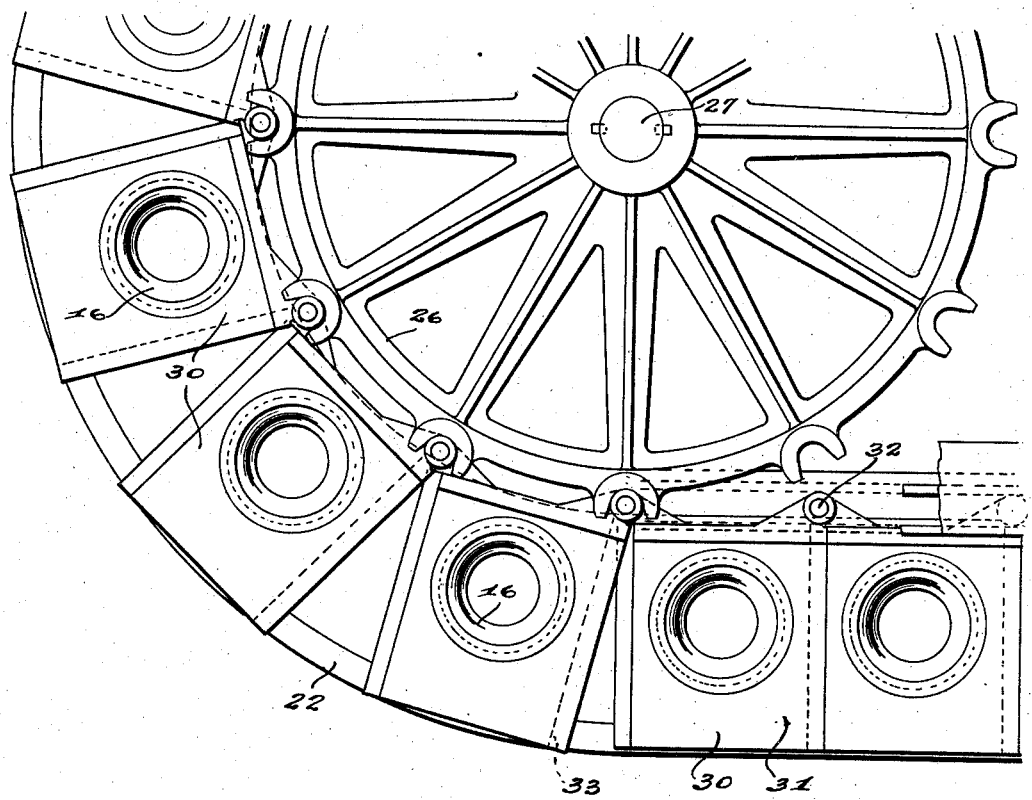
Fig. 13 is a fragmentary top plan view of one end of the neck ring conveyor.
Figure 14:
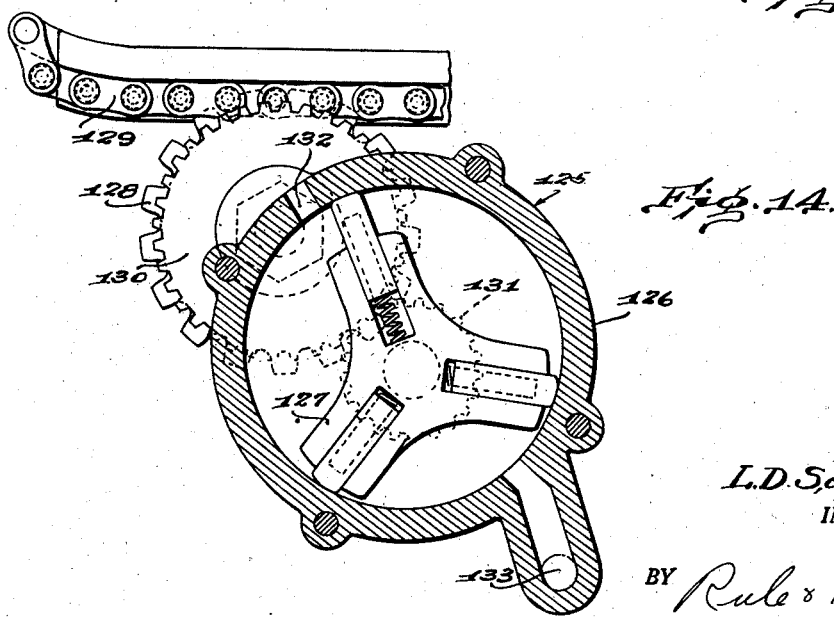
Fig. 14 is a horizontal sectional view taken through a pump employed in connection with the blowhead conveyor.

Each neck ring 16 is threadedly received in a block 30 (Figs. 11 and 13) constituting one link of an endless conveyor chain 31. The blocks 30 are pivoted to each other as at 32 and are provided with meeting surfaces 33 which, when the blocks are in the straightaway portions of the conveyor, overlap each other with the blocks occupying contiguous positions. In rounding the ends of the conveyor, the blocks separate and occupy redially disposed positions as shown in Fig. 13.

The region immediately below the discharge orifice 12 is the gathering zone and in this region the neck rings 16 are adapted to pass beneath the orifice as shown in Fig. 4 with their upper surfaces and with the upper surfaces of the blocks 30 in sealing contact with the underneath surface of the gathering ring 14. Shortly before the closed area defined by each neck ring overlaps the discharge orifice, one of the gathering cups 17 is brought into sealing engagement with the ring and vacuum applied thereto to draw a charge of molten glass into the gathering cup and ring through the latter.

Toward these ends, referring to Figs. 1, 3, 4 and 12, the gathering cup conveyor 18 includes an endless chain 35 which is driven in synchronism with the conveyor chain 31 by means of sprocket wheels 28 and 29. Each individual link 36 of the chain 35 has fitted thereinto by a driving fit a guide member 37 provided with a vertical bore 38 in which there is slidably mounted a hollow cup supporting rod 39 the upper end of which carries one of the cups 17. A collar 40 is secured to the rod 39 near the bottom thereof and carries a cam roller 41 designed for contact with a cam track 42 which extends through the gathering zone to a point rearwardly thereof to elevate the rod 39 and cup 17 so that the latter makes sealing contact with one of the neck rings 16. The nature of the cam track 42 is such that the cup is elevated into contact with the ring 16 prior to registry of the latter with the discharge orifice as shown in Fig. 4 and remains in contact with the ring after the latter has moved out of register with the orifice for a short period of time as will appear presently. In order to prevent turning of the rod 39 and cause misalignment of the cam roller 41 with the cam track 42, a guide rod 43 extends upwardly from the collar 40 and passes through a vertical guide 44 formed in the guide member 37.

The lower end of the rod 39 has threadedly received thereon a tapered head 45 designed for sealing contact with a suction cup 46 carried by a rotary suction applying apparatus 47.

The suction applying apparatus 47 (Figs. 4 to 9 inclusive) involves in its general organization a stationary base 48 from which there extends upwardly a hollow tubular column 49, the upper end of which is formed with a platform 50. A central shaft 51 extends through the column 49 and platform 50 and has keyed thereto as at 52 a rotary carriage 53.

A plurality of vertical guides 60 (Fig. 8) are formed in the carriage 53 and are spaced about the periphery thereof and in each guide is slidably disposed a rod 61 the upper end of which serves to support a suction cup supporting assembly 62. Each assembly 62 includes a block 63 which is formed with horizontal guideways 64 therein. Slidably retained between the guideways 64 is a suction cup retainer 65, a recess 66 being provided in the block to permit lateral shifting of the retainer 65 on the block 63. The suction cup 46 is threadedly received in a bore 68 formed in the retainer 65. The upper end of the bore 68 is tapered and is fitted with a resilient liner 69 designed for sealing engagement with the tapered head 45. The retainer 65 is normally maintained in its outer extended position as shown at the right hand side of Fig. 5 by means of a coil spring 67. Thus it will be seen that when the suction cup and head are in registry, the normal circumferential or arcuate motion of the cup about the axis of the shaft 51 is modified and a straight line motion following the straight line motion of the head is made possible.

The lower end of the bore 68 communicates through a flexible conduit 70 which communicates with the interior of a valve casing 71 secured to the carriage 53 as will appear presently. A guide pin 72 has one end secured in the block 63 and projects through a vertical guide 73 formed in the carriage 53 to prevent turning of the block 63 and consequent misalignment of the cup with the tapered head 45.

The lower end of each rod 61 is secured to and supported upon a block 80 carrying a cam roller 81 which rides upon a cam track 82 mounted on the platform 50. A spring 83 normally urges the block 80 to its lowermost position. As a consequence, the suction cups 46 are normally maintained in a lowered position out of register with the heads 45.

In order to apply vacuum to the gathering cups 17 during register of the suction cups 46 and heads 45, each valve casing 71 is formed with a valve chamber 84 (Figs. 7 and 8) therein which communicates with an annular vacuum chamber 85 formed in the carriage 53. A pair of concentric flanges 88 and 89 extend upwardly from the platform 50 and provide therebetween an annular vacuum chamber 90 communicating with the chamber 85 through a passageway 91. Packing rings 92 are disposed in the flanges 88 and 89. Vacuum is continuously applied to the chamber 90 by means of a conduit 93.

The admission of vacuum to the cup 46 through the flexible conduit 70 is controlled by means of a valve 94 (Fig. 7) disposed within the casing 71. The valve 94 is provided with a valve stem 95 which projects downwardly through the casing 71 and rides on a cam 96 supported on the platform 50. The cam 96 is provided with a circumferentially extensible section 97 (Fig. 8) by means of which the duration of application of upward thrust to the valve stem 95 may be varied to vary the duration of application of vacuum to the gathering cups 17.

Referring to Figs. 4 and 5, a vertical shaft 54 is rotatable supported on the framework 22 and carries at its upper end a rotary glass severing disk 55 a portion of which overlies the conveyor chain 31 in close proximity thereto. A worm wheel 56 at the lower end of the shaft 54 meshes with a worm 57 which is driven from any suitable source of power such as an electric motor (not shown). The cutting edge of the disk 55 extends to a point not far removed from the ironing member 20 and is adapted to underlie the ribbon R and sever the same from the charges C contained within the gathering cups 17. An air cooling drive 116 of U-shape design is adapted to direct jets of air against the upper and lower faces of the disk 55 to cool the same.

Positioned on the conveyor 18 in the path of the oncoming severed ribbon R and located directly behind the severing disk 55 is a ribbon ejecting plow 58 having a forward curved surface 59 and terminating in a forward edge which is adapted to underlie the severed ribbon R. The traveling ribbon upon encountering the plow 58 rides upwardly on the curved surface 59 thereof and is turned to one side as indicated in Fig. 4 and is thus directed over the edge of the conveyor 18 and is thus ejected from the apparatus.

Referring now to Figs. 3 and 10 to 14 inclusive, prior to lowering of the gathering cups 17 from the mobile-free charges C which are left suspended from the neck rings 16 on the conveyor chain 31, a series of combined compacting and blowing heads or units 100 mounted on the blowhead conveyor 101 are brought into operation to compact the charges C in the gathering cups 17.

The various units 100 (Fig. 10) are articulated together to form an endless conveyor chain 102 which is driven in synchronism with the conveyor chain 31 in a manner that will be set forth hereinafter by means of sprocket wheels 98 and 99 suitably supported in the framework 22. Each unit comprises a body portion or link block 103 which travels on the framework. A vertical bushing 104 (Fig. 11) extends through the link block and a hollow blow plunger 105 is slidably disposed therein. The lower end of the plunger 105 has formed thereon a compacting head 106 designed upon lowering of the plunger to engage the charge C in the neck ring 16 and section cup 17 and compact the same as shown at the right hand side of Fig. 12. A hub 107 is threadedly received on the upper end of the plunger 105 which, in turn, threadedly receives thereon a dome-shaped valve casing 108 by means of which blowing air is supplied to the plunger as will become apparent presently.

A coil spring 109 disposed between the bushing 104 and hub 107 serves to normally maintain the plunger elevated. Arms 110 carrying guide rods 111 depend from the hub 107. The guide rods 111 are slidably mounted in guides 112 formed in the link block 103 and a yoke 113 carrying a cam roller 114 has its diverging arms secured to the lower ends of the guide rods 111. The cam roller 114 is designed for engagement with a cam track 115 which is so constructed that shortly after the unit 100 passes around the sprocket wheel 98 and prior to lowering of a particular registering suction cup 17 from the charge C, the head 106 of the plunger 105 is lowered against the charge C to compact the same. Thereafter, the head 106 remains in contact with the charge through the various open air developments of the charge and through the final blowing stages.

A valve 120 (Fig. 11) disposed within the valve casing 108 controls the admission of blowing air to the plunger 105 and is provided with a valve stem 121 which projects upwardly through the casing 108 and is designed for contact with a series of cams 122, 122ª, 122ᵇ, etc. (see also Fig. 3) which are adjustably secured to the framework 22.

Figure 12:
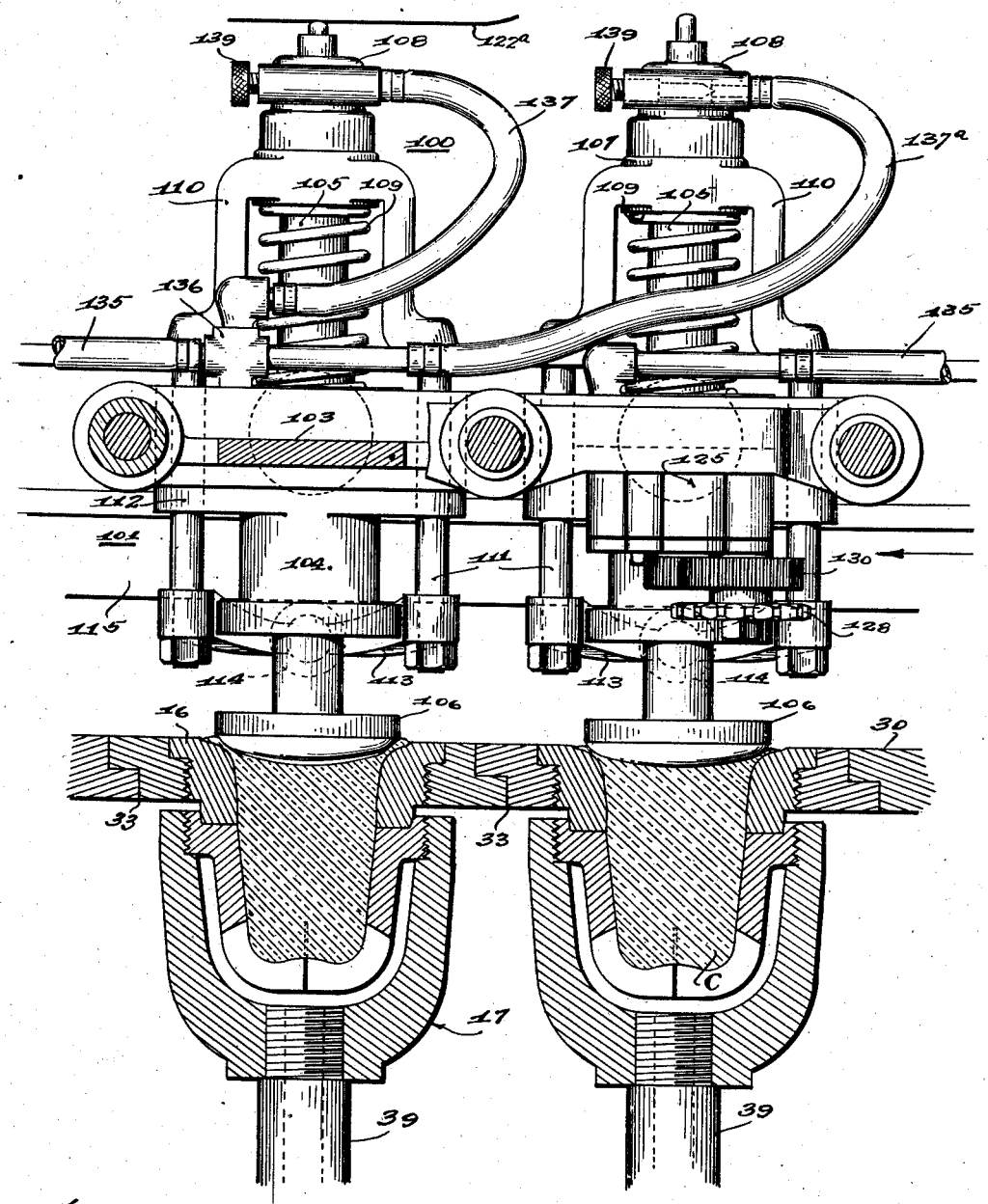
Fig. 12 is a side elevational view, partly in section, of a pair of adjacent heads of the blowhead conveyor showing the same operatively associated with the neck ring conveyor and gathering cups.

The cam 122 is provided for the purpose of admitting a charge of air under low pressure to the plunger 105 to compact the charge, as shown at the left hand side of Fig. 12, while the charge is in the gathering cup. Ordinarily, however, the pressure exerted by the compacting head 106 is sufficient for the charge compacting operation and use of the cam 122 therefore is purely optional. The cams 122ª, 122ᵇ, etc., may be employed for admitting a succession of development puffs to the charges during the open air development of the same as shown in Fig. 3. Such open air development however may take place naturally without resorting to any development puffs whatever.

Air for both the compression blow and open air development puffs (if any) and also for the final blowing operations as will appear later, is supplied to the valve casings 108 from a series of pumps 125 (Figs. 10 and 14), one of which is mounted on every fourth unit or head 100. Each pump 125 supplies air to the next adjacent succeeding three units 100 and the air for the unit on which the pump is mounted is derived from a preceding unit thrice removed.

Each pump 125 comprises a cylindrical casing 126 (Figs. 11 and 14) secured to the link block 103 and having a conventional eccentrically mounted rotor 127 therein which is tractionally driven by means of a traction gear 128 that meshes with a rack 129 and which is connected to the rotor through gears 130 and 131. Air admitted to the casing 126 through an inlet port 132 is expelled through an outlet port 133 which communicates through a channel 134 in the link block 103 with a flexible conduit 135 leading to a three way fitting 136 mounted on the next succeeding adjacent unit 100 from which air is distributed through a flexible conduit 137 to its respective valve casing 108 and from which air is also distributed through a flexible conduit 137ª to the valve casing of the next adjacent unit 100. The application of air from the pump on one unit to the valve casing 108 on the next adjacent several units 100 makes it possible to have the traction gear 128 contact the rack 129 and set the pump 125 into operation to develop sufficient air pressure within the valve casings 108 of the adjacent units before the valve stems 121 of those units contact the compression blow cam 122 if such cam be employed. Pressure regulating valves 139 control the amount of air admitted to the casings 108 and are employed to compensate for the differences in air pressure developed in the various lengths of flexible tubing leading to the valve casings.

Referring now to Figs. 3, and 15 to 17 inclusive, the finishing mold conveyor 140 is mounted on the framework 22 and includes a plurality of finishing mold heads or units 141 articulated together to form an endless conveyor chain 142 which is driven by means of sprocket wheels 143 and 144 (Fig. 1) in synchronism with the conveyor chain 31.

Each unit 141 consists of a link block 145 or cage in which there is rotatably journalled and supported in antifriction bearings 146 a vertical shaft 147. A hinge pin 148 extends transversely through the upper end of the shaft 147 and a pair of tiltable mold plates 149 are formed with ears 150 adjacent the inner sides thereof that are connected to the hinge pin 148.

Slidably disposed on the shaft 147 is a collar 151 having ears 152 projecting therefrom at right angles to the axis of the hinge pin 148. The ears 152 are connected through links 153 to depending ears 154 formed on the mold plates 149 near the outer sides thereof.

A pair of finishing mold sections 155 are secured to the mold plates 149 and cooperate with each other to form a complete finishing mold 156 when the mold plates 149 occupy horizontal positions in substantial alignment with each other as shown in Fig. 17.

It will readily be seen that shifting of the collar 151 vertically on the shaft 147 will control the opening and closing movements of the mold sections 155, the mold being open when the collar assumes its lower position and being closed when the collar is in its uppermost position.

In order to actuate the collar 151, a shifting yoke 157 consisting of separable sections bolted together embrace a groove 158 formed in the collar. A pair of trunnions 159 extend outwardly from the yoke 157 and extend through respective inclined slots 160 formed in a shifting frame 161. The trunnions 159 also extend through vertical slots 162 formed in the cage 145 and are provided with antifriction rollers 163 and 164 for engagement with the walls of the slots 160 and 162 respectively. The frame 161 carries rollers 163' at its ends which are designed for engagement with respective cam rails 164' and 165 the latter being so designed to shift the frame and elevate the collar 151 thus closing the mold sections 155 about the suspended charges which have just been subjected to the open air development as previously described and as shown in Fig. 3. The cam rail 164' is designed to shift the frame and open the mold sections to release the completed articles which have been blown to final shape therein.

Figure 15:
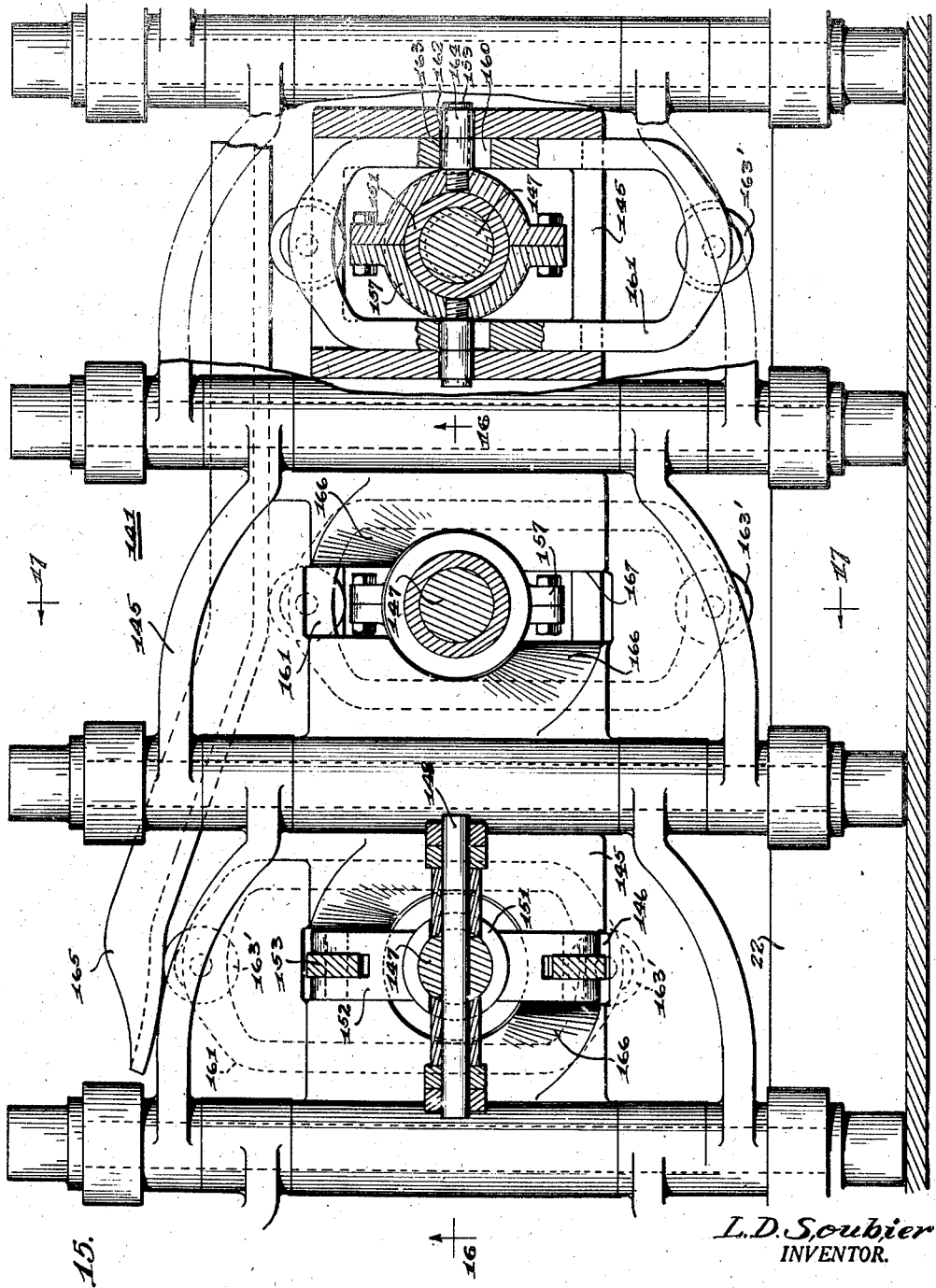
Fig. 15 is a fragmentary plan view, partly in section, of three adjacent heads of the blowhead conveyor.
Figure 16:
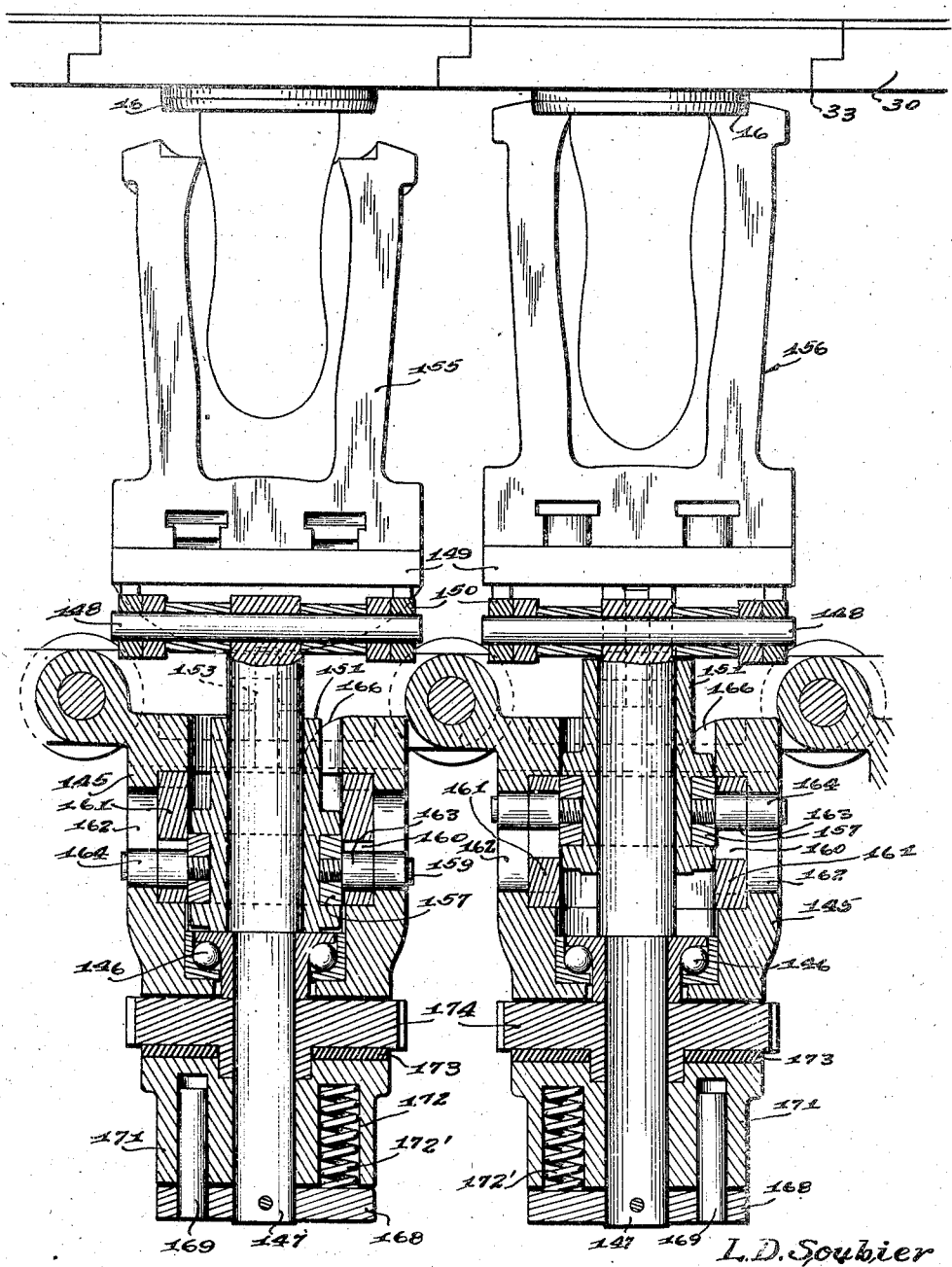
Fig. 16 is a sectional view taken substantially along the line 16—16 of Fig. 15.

Referring now to Figs. 15 and 16, the ears 152 formed on the collar 151 have freedom of movement with the rotating shaft 147 when the collar 151 is in its elevated position as shown in the illustration of the right hand mold unit of Fig. 16. However, upon lowering of the collar 151 these ears will engage the upper surface of the link block 145 and ride downwardly on a pair of generally rounded contact areas 166 (Fig. 15) and become confined in a transverse slot 167 formed in the link block to prevent rotation of the open mold sections and also to insure alignment of the hinge pins 148 on the conveyor after the blowing operations have terminated and the molds have become opened.

In order to rotate the shaft 147, the lower end thereof has secured thereto a ring 168 from which there extends upwardly a plurality of pins 169. The pins 169 project into corresponding recesses 170 formed in a friction clutch collar 171. Additional recesses 172 have springs 172' therein that serve to normally urge the collar 171 into engagement with a friction ring 173 which is confined between the collar 171 and a gear 174 loosely mounted on the shaft 147. The gear 174 is designed for engagement with a rack 175 (Figs. 1 and 17) which extends longitudinally of the conveyor through a zone extending from a point near the region at which the cam rail 165 commences to a point near the rear end of the conveyor. In traveling through this zone, each gear 174 tractionally engages the rack 175 and is rotated thereby, thus causing rotation of the closed finishing molds as they pass through the zone.

In traveling through this zone, which is represented by the extent of the rack 175, means is provided for opening the valves 120 to admit blowing air to the interior of the cavities formed in the charges during the open air development thereof. Accordingly a cam rail 176 (Fig. 1) is substantially coextensive with the rack 175 and is designed for engagement by the successive valve stems 121 of the units 100.

After the charges have been expanded to final shape in the rotating finishing molds, the shifting frame 161 is moved transversely of the conveyor chain 142 by virtue of the cam rail 164' which engages the roller 163'. Such shifting of the frame 161 serves to open the mold sections 155 in the manner previously described to release the articles and leave the same suspended from the neck rings 16 from whence they may be removed from the apparatus.

Referring now to Fig. 1, the gathering cup conveyor 19, the blowhead conveyor 101, and the finishing mold conveyor 140 are driven in synchronism with the neck ring conveyor 18 by means of an electric motor M' which may be connected to the motor M by a conventional synchro-tie arrangement of electrical wires and devices (not shown). The various conveyors employ a system of shaft lines and gearing designated generally at 177 for this purpose.

Modifications may be resorted to within the spirit and scope of the appended claims.

I claim:

1. The method of making glass articles which consists in issuing a stream of glass from a melting furnace, ironing the stream of glass on a traveling apertured conveyor to form a ribbon while periodically drawing measured charges from the stream through the apertures on the conveyor by suction, and blowing articles from the formed charges as the same travel with the conveyor.

2. The method of making glass articles which consists in issuing a stream of glass from a melting furnace, ironing the stream of glass on a traveling apertured conveyor to form a ribbon while periodically introducing charges from the stream through the apertures and into a series of measuring cups moving with the conveyor by the application of suction to the cups, withdrawing the measuring cups to leave the charges suspended from the conveyor, and blowing articles from the suspended charges as the same travel with the conveyor.

3. The method of making glass articles which consists in issuing a stream of glass from a melting furnace, ironing the stream of glass on a traveling apertured conveyor to form a ribbon on the conveyor while periodically introducing charges from the stream through the apertures and into a series of measuring cups moving with the conveyor by the application of suction to the cups, anchoring the charges to the conveyor, withdrawing the measuring cups to leave the charges suspended from the conveyor, and blowing articles from the suspended charges as the latter travel with the conveyor.

4. The method of making glass articles which consists in issuing a stream of glass from a melting furnace, ironing the stream of glass on an apertured traveling conveyor to form a ribbon while periodically drawing measured charges from the stream through the apertures of the conveyor by suction, severing the ribbon from the charges, and blowing articles from the charges as the same travel with the conveyor.

5. The method of making glass articles which consists in issuing a stream of glass from a melting furnace, ironing the stream of glass on a traveling conveyor to form a ribbon while periodically drawing measured charges from the stream through the apertures on the conveyor by suction, severing the ribbon from the charges, anchoring the charges to the conveyor, and blowing articles from the suspended charges as the latter travel with the conveyor.

6. The method of making glass articles which consists in issuing molten glass from a melting furnace in a stream, flattening the issued glass into ribbon form on a traveling apertured conveyor while simultaneously moving measured quantities of glass from the stream through the apertures of the conveyor by suction and receiving the same in a series of measuring cups moving with the conveyor, severing the ribbon from the measured quantities of glass, anchoring the meassured quantities of glass to the conveyor, withdrawing the measuring cups from the measured quantities of glass to leave the same suspended from the conveyor as body blanks, and blowing the body blanks to final form as the same travel with the conveyor.

7. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a series of measuring cups below and moving with a portion of the conveyor, and means for applying suction to said cups to draw measured charges thereinto through the apertures.

8. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a stationary ironing member positioned above the conveyor in the path of said stream for flattening the stream against the conveyor, and means positioned below the conveyor for drawing measured charges through the apertures from the stream prior to flattening of the latter by the ironing member.

9. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a stationary ironing member positioned above the conveyor for flattening the stream against the conveyor, a series of measuring cups positioned below the conveyor, means for causing register of the cups with the apertures and for moving the cups with the sections of the moving conveyor through a portion thereof, and means for applying suction to the measuring cups during such movement thereof.

10. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a stationary ironing member positioned above the conveyor in the path of said stream for flattening the stream against the conveyor into ribbon form, means positioned below the conveyor ahead of the ironing member for drawing measured charges through the apertures from the stream prior to flattening of the latter by the ironing member, and means positioned behind the ironing member for severing the ribbon from the charges comprising a disk rotating substantially in the plane of the conveyor and entering between the ribbon and conveyor.

11. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a stationary ironing member positioned above the conveyor in the path of said stream for flattening the stream against the conveyor into ribbon form, means positioned below the conveyor ahead of the ironing member for drawing measured charges through the apertures from the stream prior to flattening of the latter by the ironing member, means positioned behind the ironing member for severing the ribbon from the charges comprising a disk rotating substantially in the plane of the conveyor and entering between the ribbon and conveyor, and a stationary plow member having an upwardly curved surface adapted to underlie the severed ribbon and turn the same laterally from the conveyor.

12. In a glass forming machine, the combination with a moving conveyor including a plurality of articulated sections moving in a closed path, each section having an aperture formed therein, said sections forming a continuous glass supporting surface, and means positioned above the conveyor for discharging a continuous stream of glass onto the latter, of a stationary ironing member positioned above the conveyor in the path of said stream for flattening the stream against the conveyor into ribbon form, means positioned below the conveyor ahead of the ironing member for drawing measured charges through the apertures from the stream prior to flattening of the latter by the ironing member, and a plow member having an upwardly curved surface adapted to underlie the ribbon and turn the same laterally from the conveyor.

13. The method of making glass articles which consists in issuing a stream of glass from a melting furnace, ironing the stream of glass on a traveling apertured conveyor to form a ribbon while simultaneously and periodically drawing measured charges from the stream through the apertures of the conveyor by suction, anchoring the charges to the conveyor, compacting the anchored charges, and expanding the charges to final form as the same move away from the melting furnace.

14. The method of forming glass articles which consists in drawing a continuous stream of glass downwardly from a supply body by suction, transforming the stream of glass into a series of mold charges each including some glass in excess of the desired amount, severing the excess glass from the mold charges and imparting final shape to the mold charges.

LEONARD D. SOUBIER.